United States Patent
Kelleher et al.

(10) Patent No.: US 11,193,776 B2
(45) Date of Patent: Dec. 7, 2021

(54) ROUTE OPTIMIZATION SYSTEMS AND METHODS

(71) Applicant: TerriTool, LLC, Newport Beach, CA (US)

(72) Inventors: Spencer Kern Kelleher, Newport Beach, CA (US); Anuj Sahni, Auckland (NZ)

(73) Assignee: Territool, LLC, Newport Beach, CA (US)

( * ) Notice: Subject to any disclaimer, the term of this patent is extended or adjusted under 35 U.S.C. 154(b) by 68 days.

(21) Appl. No.: 16/575,783

(22) Filed: Sep. 19, 2019

(65) Prior Publication Data

US 2020/0173790 A1 Jun. 4, 2020

Related U.S. Application Data

(63) Continuation-in-part of application No. 16/209,927, filed on Dec. 4, 2018.

(51) Int. Cl.
*G01C 21/34* (2006.01)
*H04W 4/02* (2018.01)

(52) U.S. Cl.
CPC ....... *G01C 21/343* (2013.01); *G01C 21/3446* (2013.01); *G01C 21/3476* (2013.01)

(58) Field of Classification Search
CPC ...... G01C 21/26; G01C 21/34; G01C 21/343; G01C 21/3446; G01C 21/3476; G01C 21/3469; G01C 21/362; G01C 21/36; G01C 21/20; G01C 21/3605; G06Q 10/047; H04W 4/023; H04W 4/024; H04W 4/029; H04W 4/02
See application file for complete search history.

(56) References Cited

U.S. PATENT DOCUMENTS

| | | | | |
|---|---|---|---|---|
| 5,802,492 | A * | 9/1998 | DeLorme | G01C 21/3476 340/990 |
| 9,157,751 | B2 * | 10/2015 | Pfeifle | G01C 21/26 |
| 10,242,571 | B1 * | 3/2019 | Stewart | G06Q 10/047 |
| 2012/0310691 | A1 * | 12/2012 | Carlsson | G08G 1/202 705/7.13 |
| 2020/0011690 | A1 * | 1/2020 | Becker | G01C 21/3679 |
| 2020/0292340 | A1 * | 9/2020 | Li | G01C 21/3446 |

* cited by examiner

*Primary Examiner* — Thomas G Black
*Assistant Examiner* — Brandon Z Willis
(74) *Attorney, Agent, or Firm* — Lynch LLP

(57) ABSTRACT

This application describes systems and methods directed to route optimization for routes comprising large numbers of waypoints. When large numbers of waypoints make up a route, developing an optimized route can be computationally intensive, requiring far too much time to develop a solution that is practicable for most needs. Thus, systems and methods of the inventive subject matter involve grouping subsets of waypoints into clusters and then optimizing those clusters according to genetic algorithm development techniques. The end result is a highly optimized route developed in an amount of time that would have been impossible using standard techniques.

10 Claims, 2 Drawing Sheets

ROUTE OPTIMIZATION SYSTEMS AND METHODS

This application is a continuation in part of and claims priority to U.S. patent application Ser. No. 16/209,927 titled "Systems and Methods of Routing Optimization", filed Dec. 4, 2018. All extrinsic materials identified in this application are incorporated by reference in their entirety.

FIELD OF THE INVENTION

The field of the invention is route optimization.

BACKGROUND

The background description includes information that may be useful in understanding the present invention. It is not an admission that any of the information provided in this application is prior art or relevant to the presently claimed invention, or that any publication specifically or implicitly referenced is prior art.

Many different industries involve developing and traveling along routes that include multiple different stops. A great example, of course, is package delivery. A delivery truck must visit dozens and sometimes hundreds of different waypoints in a single route. To maximize profit and minimize time spent driving, a route passing through many different waypoints needs to be optimized. But when the number of different waypoints that must be visited grows too large, traditional route optimization techniques begin to fail—it simply takes too long to optimize routes that have large numbers of waypoints, especially when routes need to be optimized and implemented quickly after a set of waypoints is defined.

There is thus a need for improved route optimization techniques that make it possible to optimize routes that take into account large number of waypoints, and it has yet to be appreciated that genetic algorithm techniques can be implemented to take large waypoint sets, break them into clusters, and then optimize those subsets individually to create a highly-optimized route in a span of time orders of magnitude smaller than was previously possible.

SUMMARY OF THE INVENTION

The present invention provides apparatuses, systems, and methods in which a route that travels through a set of waypoints can be optimized using genetic algorithm development techniques. In one aspect of the inventive subject matter, a waypoint routing system is contemplated to include the following. A platform server having executable code stored thereon, where, upon executing the executable code, the platform server is configured to: receive, from a client device, a set of waypoints, where each waypoint comprises location information; fetch latitude and longitude information for each waypoint in the set based on the location information for each waypoint in the set; calculate a time matrix using the waypoints in the set; calculate a distance matrix based on the waypoints in the set; create a fitness function that is a function of the time matrix and the distance matrix; create a set of possible routing solutions; use the fitness function to evaluate each possible solution in the set of possible solutions; create a crossover solution by performing a crossover operation using at least two possible solutions from the set of possible solutions; place the crossover solution in a set of second generation solutions; create a mutation solution by performing a mutation operation on at least one of the possible solutions from the set of possible solutions; place the mutation solution in the set of second generation solutions; use the fitness function to evaluate each solution in the second generation of solutions; and transmit a high performing solution from the set of second generation solutions to the client device.

In some embodiments, the crossover operation comprises combining a first possible solution with a second possible solution to create a third possible solution, where each of the first possible solution, the second possible solution, and the third possible solution each comprise an identical quantity of waypoints. A mutation operation can include making at least one change to a possible solution to create a new possible solution. In some embodiments, the location information comprises an address. The set of possible routing solutions can include randomly generated routing solutions.

In another aspect of the inventive subject matter, a method of optimizing a route is contemplated. The method includes the steps of: receiving, at a platform server from a client device, an optimized route request, the optimized route request comprising a set of waypoints, wherein each waypoint comprises location information; fetching, from a third-party server, latitude and longitude information for each waypoint in the set based on the location information for each waypoint in the set; calculating a time matrix using the waypoints in the set; calculating a distance matrix based on the waypoints in the set; creating a fitness function that is a function of the time matrix and the distance matrix; creating a set of possible routing solutions, where each routing solution in the set of possible routing solutions comprises every waypoint from the set of waypoints; applying the fitness function to each possible solution in the set of possible solutions to determine a fitness for each possible solution; creating a crossover solution by performing a crossover operation using at least two possible solutions from the set of possible solutions; placing the crossover solution in a set of second generation solutions; creating a mutation solution by performing a mutation operation on at least one of the possible solutions from the set of possible solutions; placing the mutation solution in the set of second generation solutions; applying the fitness function to each solution in the second generation of solutions; identifying a high performing solution from the second generation of solutions; and sending, to the client device, the high performing solution.

In some embodiments, the location information comprises an address, and in some embodiments, the set of possible routing solutions can include randomly generated routing solutions. A fitness function can be expressed as a matrix and the method can additionally include the step of pre-processing the fitness function to eliminate blank locations prior to the step of applying the fitness function. In some embodiments, the crossover operation includes the steps of: combining a first possible solution with a second possible solution to create a third possible solution, where each of the first possible solution, the second possible solution, and the third possible solution each comprise an identical quantity of waypoints.

One should appreciate that the disclosed subject matter provides many advantageous technical effects including making development of routing solutions using large numbers of waypoints possible. Previously, route optimization for many waypoints was too computationally intensive to be practicable. For example, it might take hours, days, weeks, months, or even years to develop adequate solutions using traditional computing techniques, but by implementing genetic algorithm techniques, computation times are brought down enough to make routing optimization possible for much larger quantities of waypoints than has ever been possible before.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
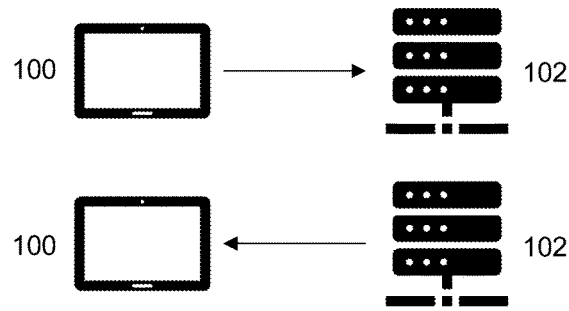
FIG. 1 shows how information flows between client devices and service platforms of the inventive subject matter.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

The inventive subject matter is directed to systems and methods designed to facilitate routing, especially in the context of delivery routing. Users can input a series of waypoints along with other information (e.g., start and stop locations) and receive in return an optimized route that passes through each waypoint. Embodiments of the inventive subject matter are preferably implemented as an app on a user-controlled computing device along with software operating on a platform server.

FIG. 1 shows generally how requests and responses are transmitted. A user-operated computing device 100 (where a computing device can be, e.g., any network enabled device such as a tablet, a computer, a smartphone, etc.) can send a route request to a platform server 102, and that platform server 102 can, in turn, send a routing response to the user's computing device 100. The computing device 100 and the platform server 102 can be informationally coupled by any type of network connection.

Figure 2:
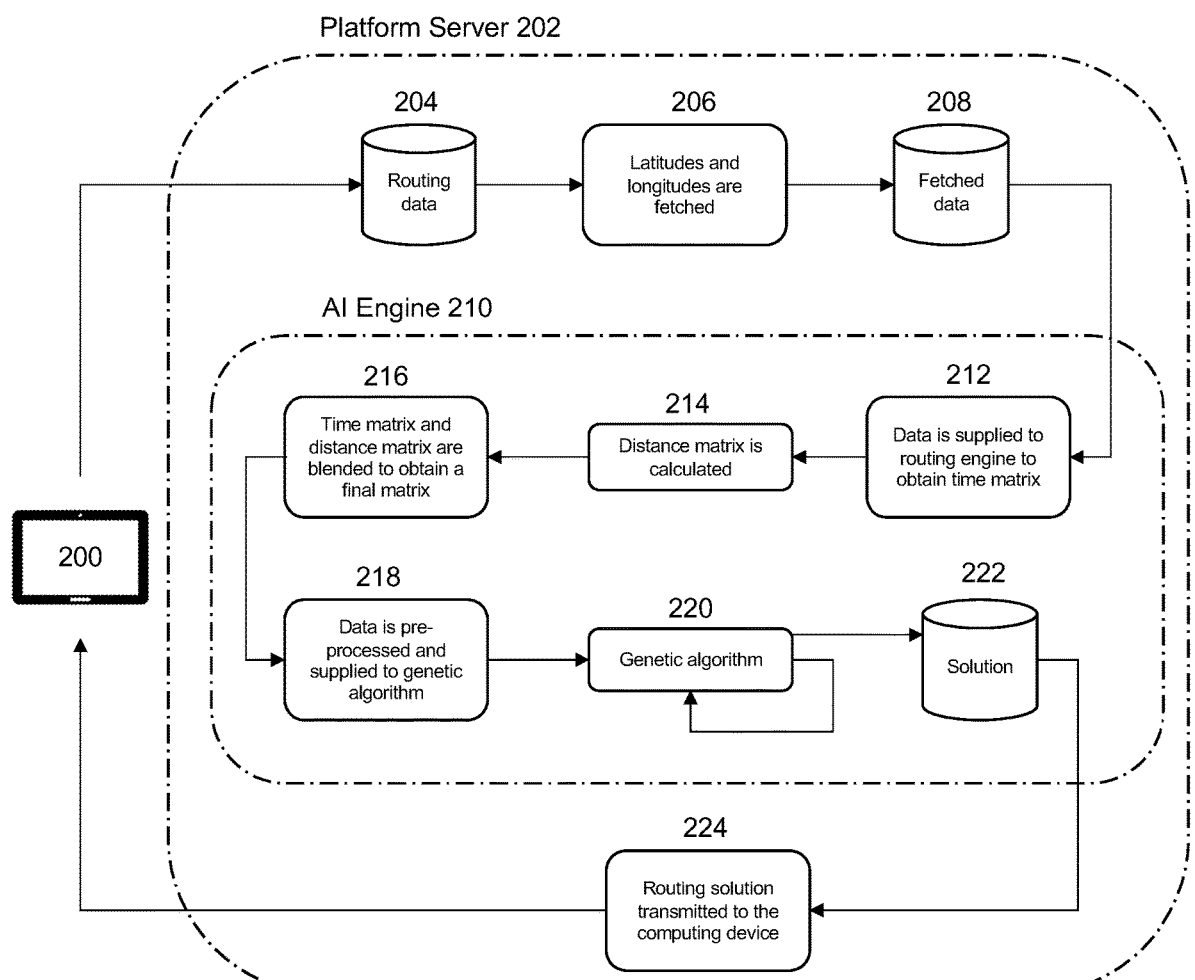
FIG. 2 is a schematic showing the internal workings of a platform server of the inventive subject matter.

Communications between a computing device and a platform server, as well as what a platform server does with information that it receives from a user, are elaborated on below in discussion related to FIG. 2. FIG. 2 shows a computing device 200 that sends a routing request to a platform server 202. The routing request includes routing data, and routing data includes waypoint information for a set of waypoints that the user has selected. A set, as used in this application, can include one or more items. Waypoint information can include names of places to be visited (e.g., a company name), addresses, cities, states, postal codes, contact details such as mail IDs, phone numbers, mobile numbers, statuses, and so on. In some embodiments, a user's computing device (e.g., software installed on the computing device) uses most of the waypoint information (e.g., as opposed to the platform server's AI engine). The AI engine, on the other hand, uses longitude and latitude data that is fetched based on the waypoint information (e.g., using an address and its constituent components including city, state, postal code).

Thus, the routing request is received by the platform server 202 (step 204) and routing data from that request is used by the platform server 202 to fetch latitudes and longitudes corresponding to each waypoint in the routing data (step 206). That fetched data 208 is then passed to an AI engine 210 that runs on the platform server 202. In the AI engine 210, fetched data is first received by a routing engine (e.g., an Open Source Routing Machine (OSRM) that can find shortest pathways between waypoints on road networks) operating on the platform server 202 (step 212) so that the routing engine on the platform server 202 can create a time matrix.

In some embodiments, a time matrix is a squared matrix of dimension n×n, where n is the number of waypoints in the fetched data (e.g., expressed as latitude, longitude pairs). A completed time matrix expresses travel time between each waypoint to every other waypoint (e.g., as hours and minutes as shown in Table 1, as seconds, minutes, hours, days, months, or any combination thereof, etc.). Table 1, below, shows an example time matrix where the letters along the top and left side of the table represent waypoints, each comprising a latitude, longitude pair.

TABLE 1

Time Matrix

|   | 1 | 2 | 3 | 4 | 5 | 6 | 7 |
|---|---|---|---|---|---|---|---|
| 1 | 0 | 1:42 | 10:15 | 5:43 | 6:23 | 7:12 | 8:32 |
| 2 | 1:50 | 0 | 4:17 | 4:22 | 2:52 | 2:43 | 1:43 |
| 3 | 10:46 | 4:00 | 0 | 1:17 | 8:59 | 2:56 | 1:15 |
| 4 | 5:32 | 4:35 | 1:45 | 0 | 4:29 | 6:19 | 9:28 |
| 5 | 6:02 | 3:34 | 9:30 | 4:01 | 0 | 2:33 | 6:04 |
| 6 | 7:30 | 3:00 | 2:30 | 6:15 | 2:46 | 0 | 6:38 |
| 7 | 8:53 | 1:17 | 1:43 | 9:58 | 6:17 | 6:05 | 0 |

With a time matrix created, the AI engine 210 then calculates an initial distance matrix (step 214). The initial distance matrix can be calculated by calculating cartesian equations expressing straight-line distances from each waypoint to every other waypoint. An initial distance matrix can be expressed as a square, n×n matrix.

Once both a time and initial distance matrices are developed, a final matrix is calculated using the time matrix and the initial distance matrix (step 216). In some embodiments, the final matrix is calculated according to the following formula:

$$F = \frac{T + wD}{1 + w}$$

where T represents the time matrix, D represents the initial distance matrix, and w is an empirical weight, adjusted after going through several test result outputs. A result output is a final route that is created through the course of implementing an embodiment of the inventive subject matter. Routes created with different weight values can be tested and compared to determine the most effective weight value, and it has been discovered that a weight value between 0.4 and 1 yielded the best results (e.g., preferably 0.7 or thereabouts).

Next, the final matrix must undergo pre-processing according to step 218. Pre-processing is primarily undertaken to prepare data for genetic algorithm development. Duplicate and empty data points are removed from the final matrix, and data structures are changed to ensure suitability for genetic algorithm development. Initially, data points have at least two components: latitude and longitude (e.g. actual latitude and longitude data or latitude and longitude data stored in some other format). Information relating to a set of waypoints to which a data point relates is then added to each data point. Each data point is referred to by its matrix index in an initial database, and genetic algorithm inputs and outputs are thus formatted in the form of a list of matrix indices. An initial database can be, e.g., one provided from a standalone or web application of the inventive subject matter.

After the final matrix has undergone pre-processing, it can then be used to develop a genetic algorithm according to step 220. Genetic algorithm development in the context of the inventive subject matter uses an array of numbers as an input, where each number represents a latitude, longitude pair (e.g., the numbers expressed in Table 1 and described above). If, for example, there are 5 waypoints (e.g., waypoints 1-5) representing 5 latitude, longitude pairs, then those waypoints can be represented as numbers 0-4 for genetic algorithm development purposes.

Genetic algorithm development (step 220) begins by creating a first set of possible solutions that all express a proposed route passing through every waypoint. A set of five random solutions could be expressed, for example, as arrays: [0,1,2,3,4], [0,2,1,3,4], [0,2,1,4,3], [0,1,2,4,3], and [1,0,2,3,4], where [0,1,2,3,4] expresses a route that starts at waypoint 0 and ends at waypoint 4.

Each randomly created possible solution is then evaluated based on a fitness factor, in this case the fitness factor is a total distance traveled by following a route in a possible solution. In some embodiments, the lower the distance, the better the route. For first possible solution in the example above ([0,1,2,3,4]), distance is calculated by retrieving values from the final matrix (see step 216). Fitness factor values can be computed using the final matrix and can be expressed as, e.g., F[0][1]+F[1][2]+F[2][3]+F[3][4], where F[A][B] represents the final matrix evaluated for waypoints A and B, thus retrieving a fitness factor between waypoints A and B. The fitness factor is thus a function of distance, time, and a predefined weight, and fitness factor values added together for each possible route can thus be used to determine efficiency of a route based on travel time and distance for that route. This same calculation can be undertaken for all possible solutions in the first set of randomly generated solutions, and the solutions are then sorted based on fitness values.

Once fitness values are calculated for all possible solutions in the first set, some number of top-performing possible solutions (e.g., those possible solutions resulting in the most optimized fitness factors) from the first set are stored in a second set of possible solutions. One or more crossover operations can then be performed along with one or more mutation operations. A crossover operation creates a new possible solution by combining two or more existing possible solutions. For example, two random solutions can be selected—one from the first set and one from the second set—and from those two random solutions, a child can be created by a crossover operation. The child is then stored to a third set of possible solutions. Crossover operations can be performed as many times as there are members of the second set.

Mutation operations, on the other hand, change the order of one more waypoints within a possible solution, and thus, the third set can also include a mutated member of the second set. Since the second set includes some subset of the most optimized solutions from the first set, a mutation of a solution in the second set could result in a still further optimized solution. Regardless of the operation performed, each newly-created solution is called a child solution, and, in general, two children are created from two parent solutions, though more children can be produced than parents as needed. When the third set is filled with child solutions, the first set can be replaced with the third set, and the second set wiped. With the first set replaced by the members of the third set, the first set is once again evaluated to determine fitness factors for each solution, and the top performers are placed into now-empty second set so the process can be repeated. Thus, crossover and mutation operations produce new solutions that can be evaluated to determine whether these newly created solutions perform better than previously created solutions.

When a possible solution is to be mutated, two or more (e.g., up to 5, 10, 15, any value therebetween, or more) random points can be swapped with each other within the solution. In a crossover operation, two solutions are merged with each other to form one or more new solutions (referred to as "children" or "child" solutions). Introducing mutations with certain mutation probabilities can speed up convergence on a final solution. For example, if a mutation probability is 0.0005 out of 10,000, then only 5 solutions would be mutated. This results in 1 mutation per 2000 solutions, giving, e.g., 200 solution per generation, in turn resulting in 1 mutation in 10 generations. A mutation probability of 0.0005 is set empirically, though other mutation probabilities such as 0.0001 up to 0.001 are contemplated, and different mutation probabilities can be implemented to improve performance as needed. A mutation probability between 0.0005 to 0.00095 are preferable. In some embodiments, mutation probabilities can be adjusted as a function of generational solution development (e.g., the mutation probability can be changed according to how many generations of solutions have been developed prior to arriving at a final solution).

Figure 3:
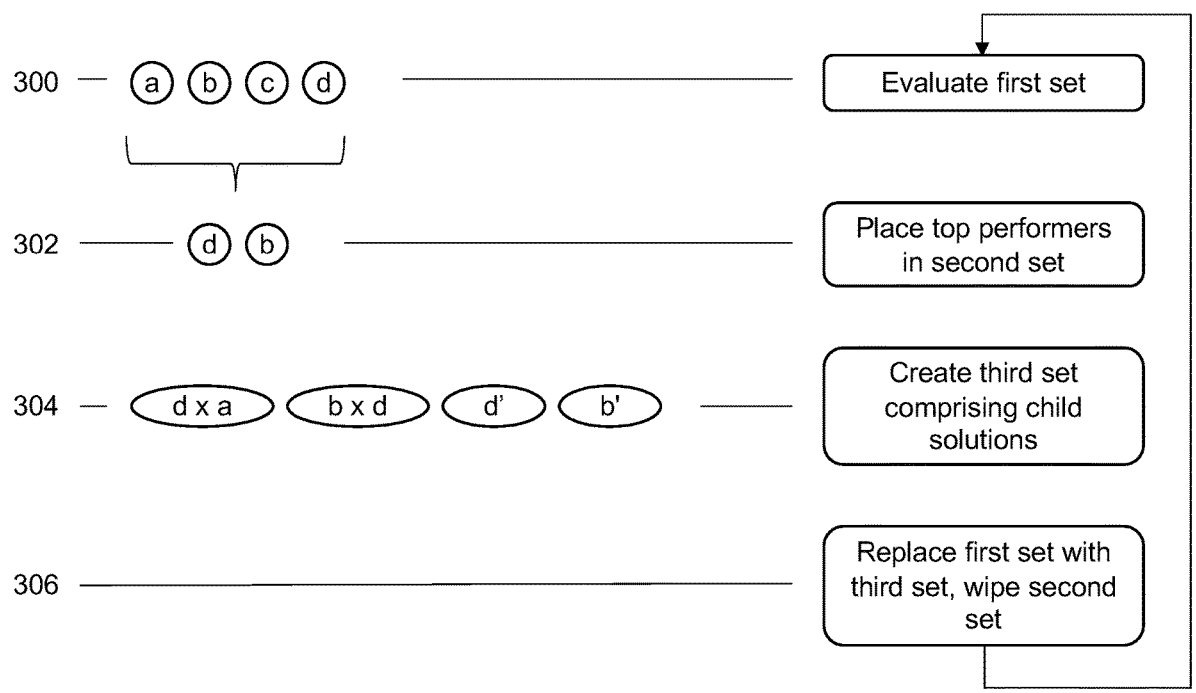
FIG. 3 shows an example of how an optimized routing solution can be converged on through iterative route development by implementing genetic algorithm techniques.

FIG. 3 is a visualization of an example of an implementation of the process detailed above. In a first step 300, a set of solutions are evaluated (in this case, the set [a, b, c, d] where each member of the set is a possible route solution). Each route is evaluated to determine a fitness factor as described above, and those top performing routes are then put into a second set of possible solutions as shown in step 302. In this example, routes d and b were the top performers, so those are placed into the second set. Although 50% of the possible solutions from the first set are placed into the second set in this example, it is contemplated that the top 5%, 10%, 15%, 20%, 25%, 30%, 40%, 50%, 60%, 70%, 80%, or any value therebetween can be placed into the second set.

With routes d and b placed in the second set, those solutions can then both be used with crossover and mutation operations. As shown in step 304, solution d is crossed with solution a (using notation "d×a" to represent a crossover of d with a) and solution b is crossed with solution d. Although a is not a top performing solution from the first set, it can still be useful in a crossover operation. Both solutions d and b, on the other hand, are top performing solutions from the first set. Step 302 thus demonstrates that crossover operations can be conducted between members of the second set only, but also between one member of the second set and one member of the first set. At least one of the solutions subject to a crossover operation should be a member of the second set. The third set also includes mutated solutions d and b, denoted as d' and b'. All these child solutions (d×a, b×d, b' and d') are all placed in a third set according to step 304.

With the third set completed, step 306 describes that the first set is replaced by the third set and the second set is wiped to make room for the top performers that are identified by repeating the first step, thus completing an iteration. Iterations of these steps are repeated until a final solution is converged upon. The number of iterative cycles that genetic algorithm development must undergo can be decided in real-time based on, e.g., the number of waypoints and how much subsequent fitness values improve over previous fitness values (e.g., in later iterations, fitness values will converge on an optimum and then fail to meaningfully improve beyond that). In practice, the number of iterations typically falls between 500 and 50,000. Once enough iterations are cycled through, the solution with the best fitness value (e.g., from the last set of route solutions, last 5 sets, 10 sets, 50 sets, or even last 100 sets of route solutions) is taken as the final solution.

In some embodiments, the first set of possible solutions are generated based on the number of waypoints by creating a possible solution for every single possible route that uses every single waypoint (e.g., when six or fewer waypoints exist in a set). In other embodiments, too many waypoints exist in a set of waypoints for it to be practical to generate a set of all possible solutions that include every single possible route through every waypoint—computation times to evaluate every possible route would be too long, making such a service useless. When too many waypoints exist, the first set of possible solutions is instead a subset of all possible solutions, and genetic algorithm techniques are relied on to arrive at an optimized solution after some number of iterations. Possible solutions subject to crossovers and mutations can be selected at random, while in other embodiments, possible solutions subject to crossovers and mutations can be selected as a function of fitness factor. Possible solutions that undergo crossovers and mutations can also be selected in part at random and in part as a function of fitness factor.

In some embodiments, waypoint sets are broken into clusters before the inventive subject matter is applied. This can help reduce computing time required for genetic algorithm techniques to converge on an optimal route by breaking up a set of waypoints into multiple clusters where each cluster can be optimized individually. In such embodiments, the overall route and each cluster can all have start and end points that can be considered during optimization. Start and end points for each individual cluster can depend on the location of a previous and subsequent cluster or on a previous start location for the route or a subsequent end location for the route (e.g., in there is no previous cluster or no subsequent cluster, respectively). If, for example, a set of way points is broken into three clusters, a first step can be to determine an order in which each cluster should be visited along a route. Order can be determined by, e.g., a start location and end location. Thus, if a first cluster is nearest a start location and a third cluster is nearest an end location, then the clusters can be visited in order (first, second, third). The number of clusters created from a set of waypoints depends on a variety of factors including relative waypoint locations and proximities, waypoint arrangements, number of waypoints, etc.

Cluster makeup and the quantity of waypoints within a cluster can be determined on a route-by-route basis and can be determined based on geographical relativity and relationship of waypoints being considered. For example, a 200- waypoint route may include 2 clusters, 8 clusters, 16 clusters, 50 clusters or any number of clusters therebetween. There is not a theoretical upper limit to the number of waypoints or clusters that can be used with embodiments of the inventive subject matter, In embodiments where a set of waypoints is broken into multiple clusters, each cluster is subject to the steps described above with respect to FIGS. 2 & 3. In instances where a certain waypoint must be the start location and another waypoint must be the end location for a cluster, this can be considered when randomly generating possible solutions by forcing those waypoints to be the start and endpoints for any possible solution. Moreover, crossover and mutation operations can be instructed not to affect those start and end points, thus ensuring a route begins and ends in desired locations.

For some number of waypoints, x, the total number of possible solutions is:

$$\frac{(x-1)!}{2}$$

For many routing requests, too many waypoints exist for all possible solutions to be evaluated. When waypoints are broken n clusters, the number of random solutions to be generated can be the lesser of 200 and 8×n, which can be expressed as min(200, 8*n). A minimum of possible solutions to generate is determined empirically and can thus be adjusted. For example, it is also contemplated that the minimum number of solutions can be as low as min(100, 4*n), as high as min(1000, 40*n), or any minimum value therebetween. For example, using min(200, 8*n), if there are 10 clusters, then the number of random solutions to be produced would be min(200, 800), which would result in 200 randomly generated solutions. The number of clusters (n) can depend on, e.g., the number of input waypoints, how close waypoints are to each other, and waypoint arrangements.

Whether a final solution (e.g., a solution that is sufficiently optimized) has been arrived at can be determined in several ways. Since for any given set of waypoints, it is unclear how many generations of solutions must be iterated through, instead, solution optimization can be measured in terms of generational improvement. For example, in early generations, the top performing solutions can improve over previous generation top performing solutions a higher percent than in later generation (e.g., where fitness factors are used to determine performance increases between generations). In earlier generations, improvements may range from, e.g., 5-15%, but as the number of generations increases, improvements begin to slow down as a final solution is converged upon. Thus, it has been discovered that cutting off solution development when intergenerational solution improvement reaches 2% leads to a high-performing final solution without adding additional time to solution development unnecessarily. It is contemplated that solution development can alternatively be cutoff anywhere between 1-4%, depending on such factors as computational power and speed, as well as a user's needs (e.g., how well-optimized does the final solution need to be, how quickly is a final solution needed, etc.).

Referring back to FIG. 2, after step 220 is completed, an optimized route solution results and is identified according to step 222. Once that optimized solution is identified it can be stored to the platform server 202 or, in some embodiments, sent to a different server where it can be made accessible to a user as shown in step 224. In some embodiments, the optimized solution is automatically transmitted to the user upon identification, and in other embodiments, the optimized solution is sent upon user request. Regardless, once an optimized solution is identified, it can be accessed by one or more users.

Thus, specific systems and methods directed to route optimization have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A waypoint routing system comprising:
   a platform server having executable code stored thereon;
   wherein, upon executing the executable code, the platform server is configured to:
   receive, from a client device, a set of waypoints, wherein each waypoint comprises location information;
   fetch latitude and longitude information for each waypoint in the set based on the location information for each waypoint in the set;
   calculate a time matrix using the waypoints in the set;
   calculate a distance matrix based on the waypoints in the set, wherein distances in the distance matrix represent straight-line distances from each waypoint in the set to every other waypoint in the set;
   create a final matrix that is a function of the time matrix, the distance matrix, and a weight factor;
   pre-process the final matrix to remove duplicate and empty data points;
   create a set of possible routing solutions, wherein each possible routing solution incorporates a random sequence of waypoints that includes all the waypoints in the set;
   use the final matrix to evaluate fitness factors for each possible routing solution;
   creating a set of top-performing solutions, wherein the set of top-performing solutions comprises a subset of the possible solutions that correspond to better fitness factors;
   create a crossover solution by performing a crossover operation using a solution from the set of top-performing solutions and a solution from the set of possible solutions;
   place the crossover solution in a set of second generation solutions;
   create a mutation solution by performing a mutation operation on a second solution from the set of top-performing solutions;
   place the mutation solution in the set of second generation solutions;
   use the final matrix to evaluate fitness factors for each solution in the second generation of solutions; and
   based on the fitness factors of each solution in the second generation of solutions, transmit a high performing solution from the set of second generation solutions to the client device.

2. The system of claim 1, wherein the crossover operation comprises combining the solution from the set of top-performing solutions with the solution from the set of possible solutions to create the crossover solution, wherein each of the solution from the set of top-performing solutions, the solution from the set of possible solutions, and the crossover solution each comprise the same waypoints.

3. The system of claim 1, wherein the mutation operation comprises making at least one change to the second solution from the set of top-performing solutions to create a new possible solution.

4. The system of claim 1, wherein the location information comprises an address.

5. The system of claim 1, wherein each routing solution in the set of possible routing solutions is randomly generated.

6. The system of claim 1, wherein the weight factor is between 0.4 and 1.

7. A method of optimizing a route, the method comprising the steps of:
   receiving, at a platform server from a client device, an optimized route request, the optimized route request comprising a set of waypoints, wherein each waypoint comprises location information;
   fetching, from a third-party server, latitude and longitude information for each waypoint in the set based on the location information for each waypoint in the set;
   calculating a time matrix using the waypoints in the set;
   calculating a distance matrix based on the waypoints in the set, wherein distances in the distance matrix represent straight-line distances from each waypoint in the set to every other waypoint in the set;
   creating a final matrix that is a function of the time matrix the distance matrix, and a weight factor;
   pre-processing the final matrix to remove duplicate and empty data points;
   creating a set of possible routing solutions, each possible routing solution incorporating a random sequence of waypoints that includes all the waypoints in the set;
   applying the final matrix to evaluate fitness factors for each possible routing solution;
   creating a set of top-performing solutions, wherein the set of top-performing solutions comprises a subset of the possible solutions that correspond to better fitness factors;
   creating a crossover solution by performing a crossover operation using one solution from the set of top-performing solutions and one solution form the set of possible solutions;
   placing the crossover solution in a set of second generation solutions;
   creating a mutation solution by performing a mutation operation on at least one top-performing solution from the set of top-performing solutions;
   placing the mutation solution in the set of second generation solutions;
   applying the final matrix to evaluate fitness factors for each solution in the second generation of solutions;
   identifying a high performing solution from the second generation of solutions; and
   based on the fitness factors of each solution in the second generation of solutions, sending, to the client device, the high performing solution.

8. The method of claim 7, wherein the location information comprises an address.

9. The method of claim 7, wherein each routing solution in the set of possible routing solutions is randomly generated.

10. The method of claim 7, wherein the crossover operation comprises the steps of:
    combining the solution from the set of top-performing with the solution from the set of possible solutions to create the crossover solution, wherein each of the solution from the set of top-performing, the solution from the set of possible solutions, and the crossover solution each comprise the same waypoints.

* * * * *